(12) United States Patent
Wronski et al.

(10) Patent No.: US 10,164,415 B2
(45) Date of Patent: *Dec. 25, 2018

(54) JUNCTION BOX OF A RECESSED LUMINAIRE FOR INSTALLATION IN SHALLOW SPACES

(71) Applicant: Eaton Intelligent Power Limited, Dublin (IE)

(72) Inventors: Grzegorz Wronski, Peachtree City, GA (US); Zhihong Lin, Shanghai (CN); Wei Zhao, Shanghai (CN); Oliver Ernst, Peachtree City, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,210

(22) Filed: May 21, 2018

(65) Prior Publication Data

US 2018/0323592 A1 Nov. 8, 2018

Related U.S. Application Data

(63) Continuation of application No. 15/587,285, filed on May 4, 2017, now Pat. No. 9,979,169.

(51) Int. Cl.
*H02G 3/08* (2006.01)
*F21V 21/04* (2006.01)
(Continued)

(52) U.S. Cl.
CPC .............. *H02G 3/081* (2013.01); *F21S 8/026* (2013.01); *F21V 21/043* (2013.01);
(Continued)

(58) Field of Classification Search
CPC . H02G 3/081; H02G 3/14; H02G 3/20; F21V 21/043; F21V 21/048; F21S 8/026
See application file for complete search history.

(56) References Cited

U.S. PATENT DOCUMENTS 4,972,339 A 11/1990 Gabrius
5,045,985 A 9/1991 Russo
(Continued)

OTHER PUBLICATIONS

Halo E5TATNB; Eaton Lighting Spec Sheet; Feb. 9, 2016.
(Continued)

*Primary Examiner* — Dhirubhai R Patel
(74) *Attorney, Agent, or Firm* — King & Spalding LLP

(57) ABSTRACT

A junction box includes a first cover plate that covers a first open side defined by a main body, and a second cover plate that covers a second open side defined by the main body. The second cover plate includes a mounting pad to attach an electrical component thereto. The electrical component is disposed in an inner cavity defined by the main body when the second cover plate is in a closed position. Further, the junction box includes a fastening device that retains the first cover plate and the second cover plate in the closed position and operates without interfering with a mounting structure in which the junction box is disposed. Furthermore, the junction box includes chamfer walls and wire traps disposed thereon to receive and pass electrical wiring cables into the junction box therethrough.

20 Claims, 15 Drawing Sheets

(51) Int. Cl.
*H02G 3/20* (2006.01)
*H02G 3/14* (2006.01)
*F21S 8/02* (2006.01)

(52) U.S. Cl.
CPC ............ *F21V 21/048* (2013.01); *H02G 3/14* (2013.01); *H02G 3/20* (2013.01)

(56) References Cited

U.S. PATENT DOCUMENTS

| | | | |
|---|---|---|---|
| 5,746,507 A | 5/1998 | Lee | |
| 6,467,640 B1 | 10/2002 | Hung | |
| 6,474,846 B1 * | 11/2002 | Kelmelis | F21V 17/164 248/231.91 |
| 6,751,096 B2 * | 6/2004 | Aldon | H05K 5/0021 174/377 |
| 7,530,705 B2 | 5/2009 | Czech | |
| 7,798,532 B2 | 9/2010 | Huber | |
| 7,874,708 B1 | 1/2011 | Jones | |
| 8,408,759 B1 | 4/2013 | Rashidi | |
| 8,939,418 B2 | 1/2015 | Green | |
| 9,062,837 B2 | 6/2015 | Wronski et al. | |
| 9,494,307 B2 | 11/2016 | Wronski et al. | |
| 9,500,352 B2 * | 11/2016 | Van Winkle | F21V 3/0625 |
| 2002/0070043 A1 | 6/2002 | Kitajima | |
| 2015/0233402 A1 | 8/2015 | Hudson | |

OTHER PUBLICATIONS

Halo E7 Installation Instructions; Eaton Lighting; Jan. 14, 2016.
Amazon, RSA Qct 900 Quiet Ceiling Round Housings, Jan. 1, 2014; https://www.amazon.com/Quiet-Ceiling-Construction-Recessed-Housing/dp/B00JU70FC2.

* cited by examiner

JUNCTION BOX OF A RECESSED LUMINAIRE FOR INSTALLATION IN SHALLOW SPACES

CROSS-REFERENCE TO RELATED APPLICATIONS

This application is a continuation application of and claims priority to U.S. patent application Ser. No. 15/587,285, filed May 4, 2017, and titled "Junction Box of a Recessed Luminaire for Installation in Shallow Spaces" which issued as U.S. Pat. No. 9,979,169 on May 22, 2018. This application is related to U.S. patent application Ser. No. 15/587,298, filed May 4, 2017, and titled "Plaster Frame Assembly for Recessed Luminaires." The entire content of the foregoing applications is hereby incorporated herein by reference.

TECHNICAL FIELD

Embodiments of the present disclosure relate generally to lighting systems, and more particularly to a junction box associated with recessed luminaires for installation in shallow spaces.

BACKGROUND

Luminaires, such as recessed luminaires, are used in many residential, commercial, and industrial applications. Generally, the space in which to install a recessed luminaire and supporting components of the recessed luminaire, such as a junction box, is limited. For example, a ceiling space in which to install the recessed luminaire and the junction box may be approximately 3.5 inches, which is very shallow. Conventional junction boxes associated with recessed luminaires are not configured for installation in such shallow ceiling spaces while also providing adequate clearance for the hanger bars and the hanger bar fastening mechanisms that are used to mount the recessed luminaires in the shallow ceiling space. Further, conventional junction boxes that are used with incandescent light source based recessed luminaires have a larger footprint since the conventional junction boxes are designed to support transformers on an outer surface of the conventional junction boxes in separate transformer enclosures away from the electrical wiring in the conventional junction boxes. The larger footprint of the conventional junction boxes may be undesirable for installation in tight spaces. Furthermore, conventional junction boxes and components disposed within the conventional junction boxes are not easily accessible for servicing and/or inspection.

SUMMARY

In one aspect, the present disclosure can relate to a junction box that includes a main body. In particular, the main body defines an open side on one side of the main body and comprises one or more chamfer walls. Further, the junction box includes one or more wire traps disposed on at least one chamfer wall of the one or more chamfer walls. Each wire trap is configured to receive and pass an electrical wiring cable therethrough. Furthermore, the junction box includes a cover plate that has a side wall and a component mounting wall that extends substantially perpendicular to the side wall from at least a portion of a longitudinal edge of the side wall. The cover plate also includes a mounting pad that is formed in the component mounting wall. The cover plate is removably coupled to the main body and configured to cover the open side when the cover plate is in the closed position, and attach an electrical component to the mounting pad using a fastener. The electrical component is associated with an operation of a luminaire.

In another aspect, the present disclosure can relate to a junction box that includes a main body. In particular, the main body defines a first open side and a second open side. Further, the junction box includes a first cover plate that is hingedly and removably coupled to the main body and configured to cover the first open side defined by the main body when the first cover plate is in a closed position. Furthermore, the junction box includes a second cover plate that is removably coupled to the main body and configured to cover the second open side defined by the main body when the second cover plate is in the closed position. Additionally, the junction box includes a fastening device that comprises a pair of fastening features that are configured to retain the first cover plate and the second cover plate in the closed position and operate without interfering with a mounting structure in which the junction box is disposed when the pair of fastening features are released.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
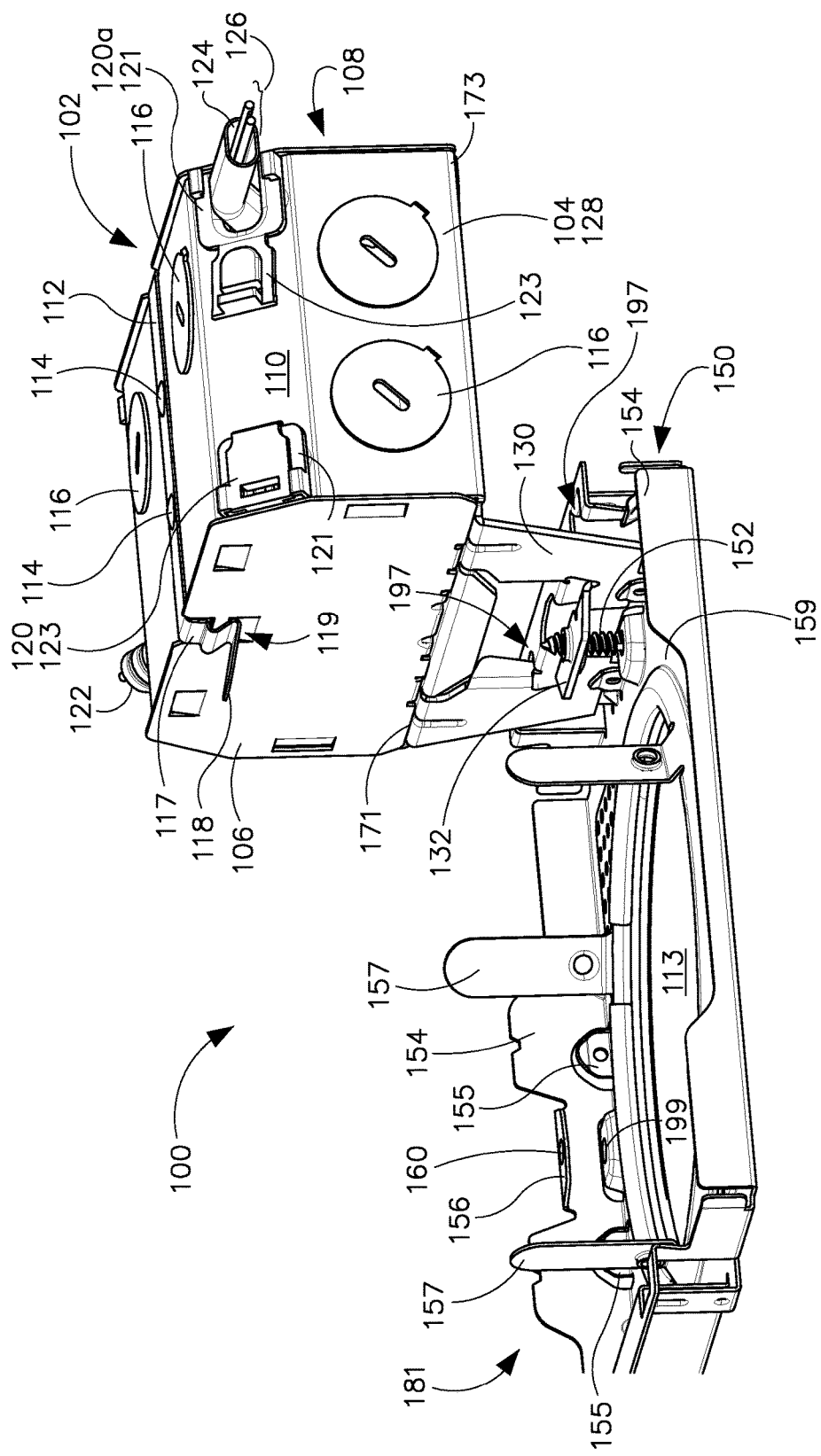
FIG. 1 illustrates a perspective view of an example junction box that is coupled to a plaster frame, in accordance with example embodiments of the present disclosure.
Figure 2:
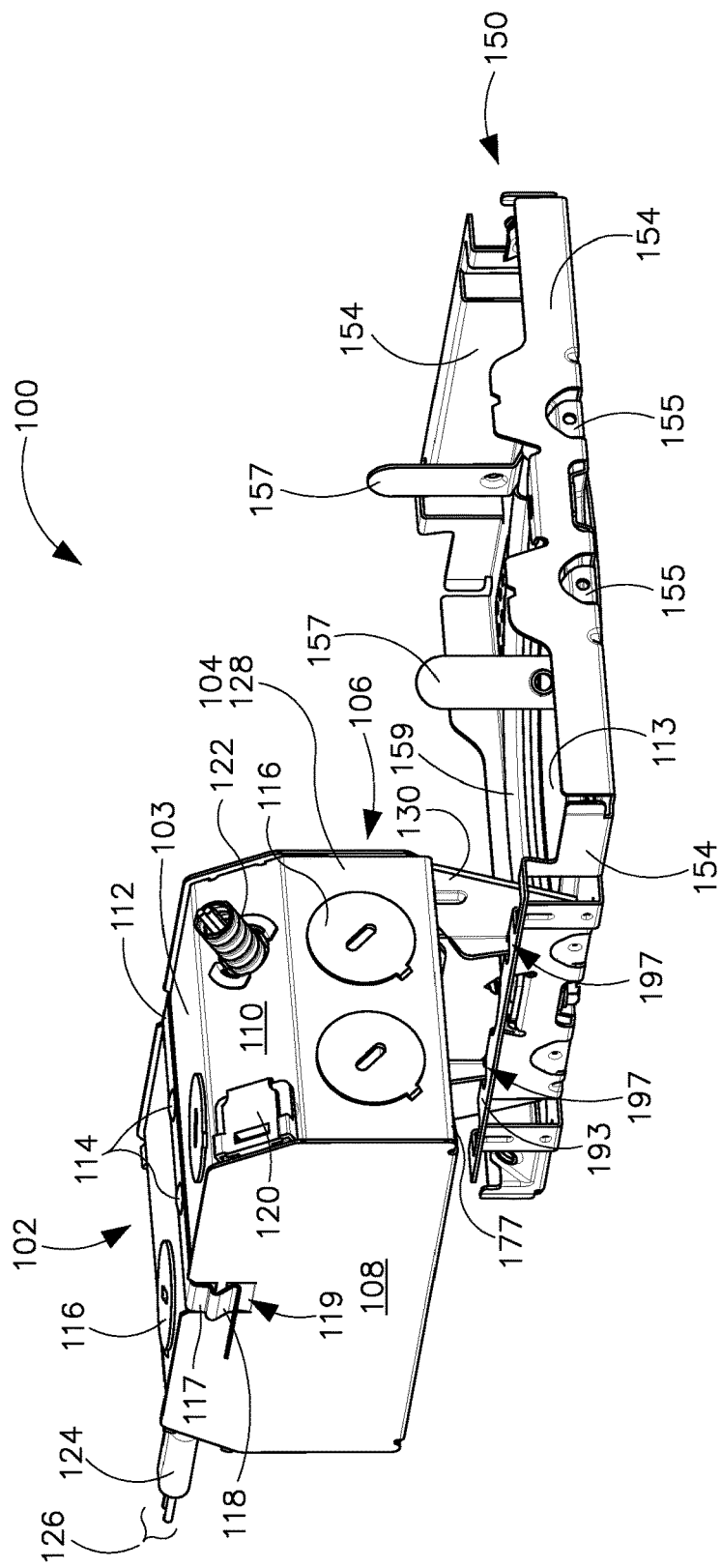
FIG. 2 illustrates another perspective view of the junction box of FIG. 1 that is coupled to the plaster frame, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles.

DETAILED DESCRIPTION OF EXAMPLE EMBODIMENTS

The present disclosure describes an example junction box that is designed for installation is shallow spaces, for example in buildings where the plenum space between the lower finished surface ceiling (herein 'lower ceiling') and the upper structural ceiling (herein 'upper ceiling') is shallow. While typically the plenum space refers to the space between the upper ceiling and the lower ceiling, one of ordinary skill in the art can understand and appreciate that in some example embodiments, the shallow plenum space may refer to the space between the lower ceiling and the ducts (or other similar wiring or piping) that are routed through and disposed in the plenum space without departing from a broader scope of the present disclosure.

The junction box of the present disclosure includes a main body that defines a first open side on one side of the main body, a second open side on an opposite side of the main body, and an inner cavity defined between the two open sides and the main body. Further, the junction box includes a first cover plate that is hingedly and removably coupled to the main body to cover the first open side defined by the main body of the junction box. Furthermore, the junction box includes a second cover plate that is removably coupled to the main body to cover the second open side defined by the main body of the junction box. The second cover plate includes a component mounting wall to which an electrical component, such as a low wattage transformer associated with the operation of a light emitting diode (LED) based recessed luminaire, can be coupled such that the electrical component and the second cover plate is movable and accessible as a single unit. For example, to access the electrical component for servicing (replacement) or inspection, a user may decouple and remove the second cover plate along with the electric component attached thereto as a single unit; service or inspect the electrical device; and/or couple or re-install the second cover plate with the electric device attached thereto as a single unit. In particular, the second cover plate and the electric component attached thereto may be removed from below (opposite side of ceiling, e.g., floor) through a can receiving opening in the plaster frame on which the junction box is mounted.

Additionally, the electrical component that is attached to the second cover plate is retained within the inner cavity of the junction box when the second cover plate is in a closed position. In particular, the first cover plate and the second cover plate are coupled to the main body such that the inner cavity is enclosed when the first cover plate and the second cover plate are in the closed position.

Further, the junction box includes a fastening device that is adapted to: (a) allow access to the inner cavity of the junction box without interference of the fastening device with a mounting structure, such as an upper ceiling, when installed in a shallow plenum space, and (b) retain the first cover plate and the second cover plate in the closed position. In particular, the fastening device includes an elongated body, regressed neck structures disposed on opposite ends the elongated body, and fastening features (e.g., springs) that are coupled to the regressed neck structures such that the fastening features are disposed at a certain distance below the elongated body by the regressed neck structures. The fastening device may be coupled to the main body of the junction box such that the fastening features on the opposite ends of the elongated body engage the respective first and second cover plates to retain the first and second cover plates in a closed position. Corresponding notches may be formed in the first cover plate and the second cover plate to accommodate the regressed neck structures of the coupling device. It is noted that the fastening features of the fastening device are positioned at a certain distance below the elongated body of the fastening device to allow the fastening device to be operated (e.g., to open and close the first and second cover plates) without interfering with the upper ceiling when the junction box is installed in a shallow plenum space.

Furthermore, the main body of the junction box includes one or more chamfer walls disposed adjacent a top wall of the main body. The chamfer walls include one or more openings that retain wire traps that are configured to receive and pass one or more electrical wire carrying cables (herein 'electrical wiring cables') therethrough. Some of the openings in the chamfer walls are configured to directly receive electrical wiring cables therethrough without the wire traps. In either case, positioning the openings and/or wire traps on the chamfer walls allow electrical wiring cables that are horizontally oriented within the plenum space (herein 'horizontally oriented electrical wiring cables') and electrical wiring cables that are vertically oriented within the plenum space (herein 'vertically oriented electrical wiring cables') to enter the junction box without having to considerably bend the electrical wiring cables, thereby minimizing any damage to the electrical wiring cables.

In contrast, conventional junction boxes that have wire receiving openings on a top wall can receive vertically oriented electrical wiring cables through the wire receiving openings on the top wall without considerably bending the electrical wiring cables. However, horizontally oriented electrical wiring cables have to be considerably bent (approximately 90 degrees) to enter the conventional junction boxes through the wire receiving openings on the top wall which may cause stress and damage to the electrical wiring cables. Similarly, other conventional junction boxes that have wire receiving openings on a side wall can receive horizontally oriented electrical wiring cables through the wire receiving openings on the side wall without considerably bending the electrical wiring cables. However, vertically oriented electrical wiring cables have to be considerably bent (approximately 90 degrees) to enter the conventional junction boxes through the wire receiving openings on the side wall. In other words, conventional junction boxes are not configured to receive both the vertically oriented electrical wiring cables and the horizontally oriented electrical wiring cables without considerably bending one of the vertically oriented electrical wiring cables and the horizontally oriented electrical wiring cables.

While the figures shown and described herein are directed to junction boxes in luminaires, example junction boxes can also be used in other applications aside from luminaires, including but not limited to motor control centers, relay cabinets, and enclosures. Thus, the examples of junction boxes described herein are not limited to luminaires. Further, with respect to luminaires, while the example embodiments described herein are directed to recessed luminaires, example embodiments (or portions thereof) can also be used for non-recessed luminaires.

Any example junction box, or portions (e.g., features) thereof, described herein can be made from a single piece (as from a mold). When an example junction box portion thereof is made from a single piece, the single piece can be cut out, bent, stamped, and/or otherwise shaped to create certain features, elements, or other portions of a component. For example, at least a portion of the junction box can be made from a single sheet where various portions are cut out, bent, shaped, and otherwise manipulated to form an example junction box. Alternatively, an example junction box (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably. In addition, each component and/or feature described herein can be made of one or more of a number of suitable materials, including but not limited to metal, and plastic.

A coupling feature (including a complementary coupling feature), a fastening feature, and/or a fastening device as described herein can allow one or more components and/or portions of an example junction box to become mechanically coupled, directly or indirectly, to a portion (e.g., a frame) of a luminaire and/or to another portion of the junction box. A coupling feature can include, but is not limited to, a portion of a hinge, an aperture (as shown), a slot, a spring clip, a tab, a detent, and a mating thread. One coupling feature, fastening feature, and/or a fastening device described herein can be the same as, or different than, one or more other coupling features, fastening features, and/or a fastening devices described herein.

Example embodiments of junction boxes will be described more fully hereinafter with reference to the accompanying drawings, in which example embodiments of junction boxes are shown. Junction boxes may, however, be embodied in many different forms and should not be construed as limited to the example embodiments set forth herein. Rather, these example embodiments are provided so that this disclosure will be thorough and complete, and will fully convey the scope of junction boxes to those of ordinary skill in the art. Like, but not necessarily the same, elements (also sometimes called components) in the various figures are denoted by like reference numerals for consistency. Terms such as "first," "second," "top," "base," "open," and "closed" are used merely to distinguish one component (or part of a component or state of a component) from another. Such terms are not meant to denote a preference or a particular orientation.

Moving now to discuss the figures, FIGS. 1-15 will describe one or more example embodiments of a junction box that is configured for installation in shallow spaces. Referring to FIGS. 1-15, an example junction box 102 that is configured for installation in a shallow plenum space 390 (shown in FIGS. 3 and 4, also indicated as 'd') between an upper ceiling 304 and a lower ceiling 302 is shown. For example, the shallow plenum space may have a height between 3 and 4 inches. In one example, the plenum space 390 may be 3.5 inches. Even though the present disclosure describes the shallow plenum space in terms of a height between the upper and lower ceilings (304, 302), it is noted that the term 'shallow plenum space' may refer to a height, a length, a breadth, a volume, an area, or any tight installation space without departing from a broader scope of the present disclosure.

As illustrated in FIGS. 1-15, the example junction box 102 may include a main body 104, a first cover plate 108, a second cover plate 106, one or more wire traps 120, and a fastening device 112 for retaining the first and second cover plates (106, 108) in a closed position. In particular, the main body 104 of the junction box 102 may include a base wall 502 (shown in FIG. 5) that has a longitudinal edge 171 and a mounting wall 130 that extends substantially perpendicular to the base wall 502 from the longitudinal edge 171. The mounting wall 130 may include one or more mounting and coupling features 595 (shown in FIG. 5) in the form of a mounting tab 132 having an aperture 709 (shown in FIG. 7), mounting wings 515, and mounting feet 512 (shown in FIG. 5). Said mounting and coupling features 595 of the junction box 102 may be configured to mount and mechanically couple the junction box 102 to the plaster frame 150.

For example, as illustrated in FIGS. 1-2 and 10-13, the junction box 102 may be mechanically coupled to the plaster frame 150 using a fastener 152, such as a threaded screw, that is passed through an aperture 709 disposed in the mounting tab 132 of the junction box 102, an aperture 160 disposed on a mounting tab 156 (shown on different side wall for clarity) of the plaster frame 150, and an aperture 199 on the base 159 of the plaster frame that are axially aligned with each other. Further, when the junction box 102 is mounted and mechanically coupled to the plaster frame 150, other mounting and coupling features 181 of the plaster frame 150, such as openings defined by the receiving tabs 155 and notches 197 in the mounting flange 193 may receive complementary mounting and coupling features 595 of the junction box 102, such as the mounting feet 512 and mounting wings 515, respectively. In particular, the coupling and mating features 181 of the plaster frame 150 may be configured to prevent the junction box 102 from moving further downward toward and/or rotating from a vertical position with respect to the plaster frame 150.

Figure 3:
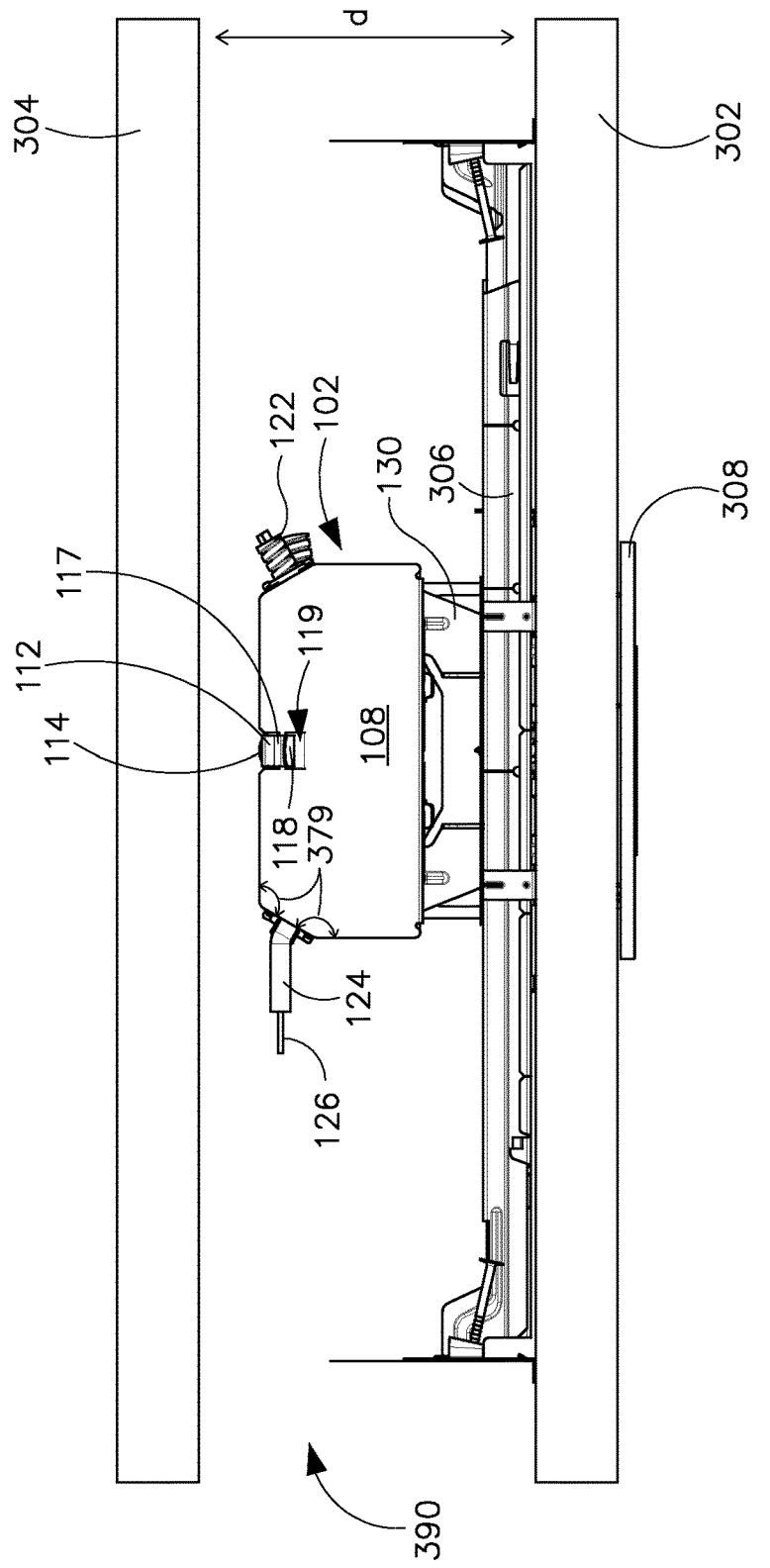
FIG. 3 illustrates a side view of the junction box of FIG. 1 that is coupled to the plaster frame and disposed in a shallow ceiling space, in accordance with example embodiments of the present disclosure.
Figure 4:
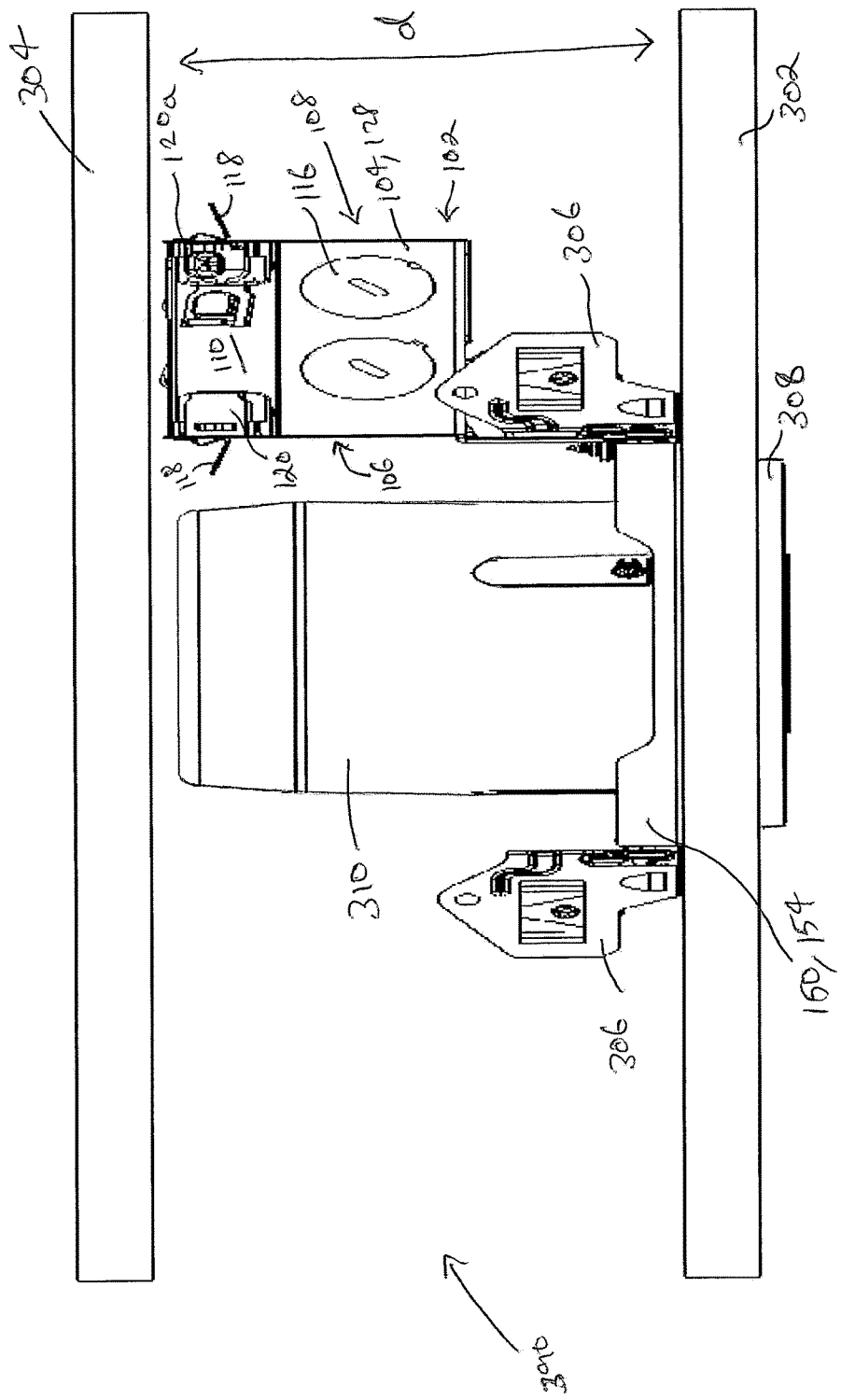
FIG. 4 illustrates another side view of the junction box of FIG. 1 that is coupled to the plaster frame and disposed in a shallow ceiling space, in accordance with example embodiments of the present disclosure.
Figure 5:
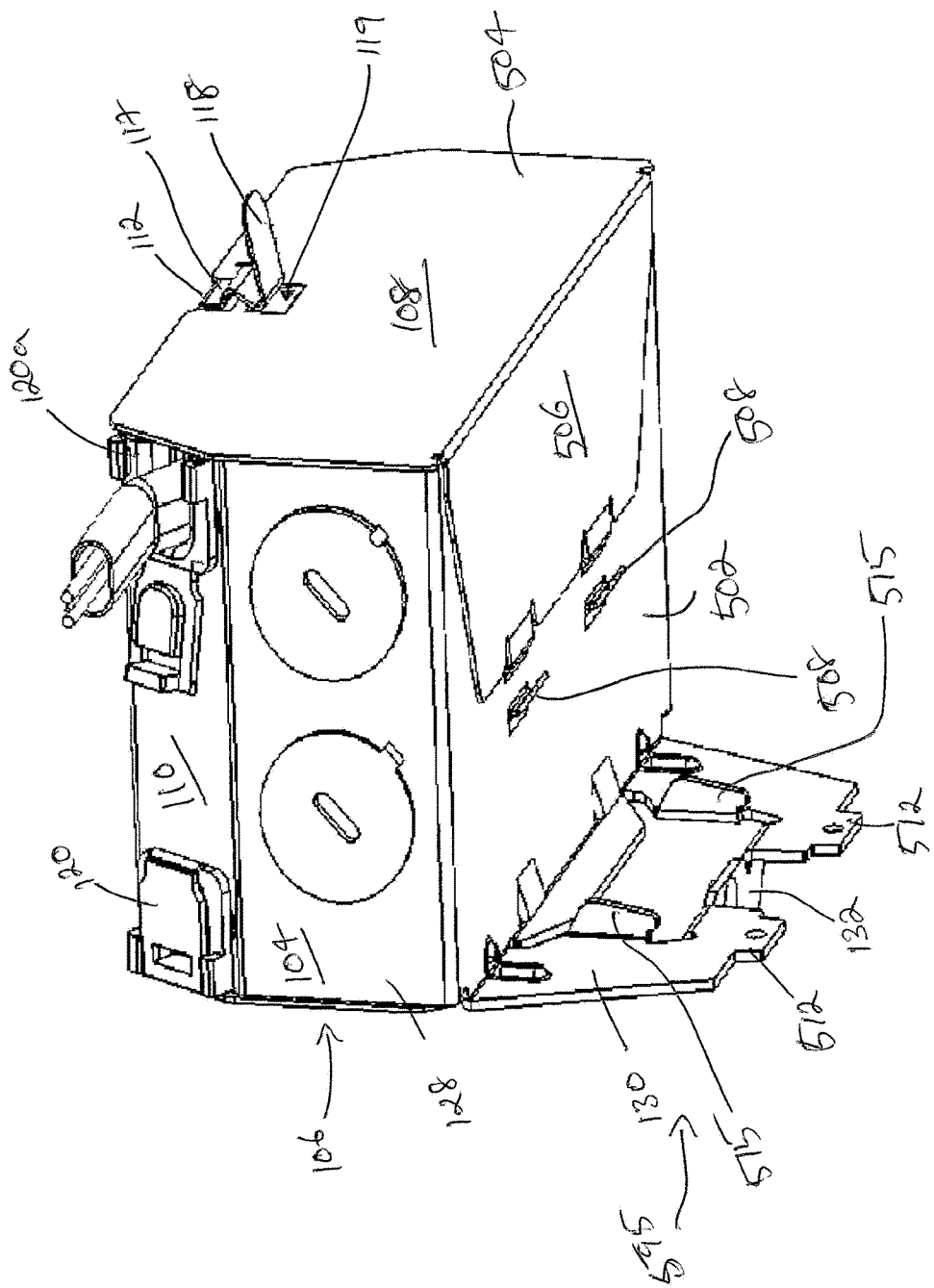
FIG. 5 illustrates yet another perspective view of the junction box of FIG. 1, in accordance with example embodiments of the present disclosure.

In certain example embodiments, the mounting wall 130 may be configured to provide a clearance between the base wall 502 of the junction box 102 and the lower ceiling 302 for accommodating, accessing, and manipulating the hanger bar assemblies 306 and the fastening mechanism associated with hanger bar assemblies as illustrated in FIGS. 3 and 4.

As illustrated in FIGS. 1-2 and 10-13, one or more of the mounting and coupling features 181 of plaster frame 150 may be formed on one or more of the side walls 154 of the plaster frame 150. In certain example embodiments, since each (or at least more than one) of the side walls 154 of the plaster frame 150 is similarly arranged with respect to the coupling and mating features 181, the junction box 102 may be coupled to any one of the side walls 154 that may have appropriate features to mount and couple the junction box.

That is, the junction box 102 can be moved by a user, changing positions and/or orientations of the junction box 102 relative to the plaster frame 150 as desired. For example, the junction box 210 can be moved with or without the use of tools (e.g., wrench, screwdriver) from one side wall to another side wall of the plaster frame 105.

In addition to mounting the junction box 102, the plaster frame 150 may be configured to mount other components of a luminaire such as a recessed housing can 310 (shown in FIG. 3), a light source disposed inside the recessed housing can 310, etc. Accordingly, the plaster frame 150 may include a base 159 that includes a can receiving opening 113 and a plurality of sealing tabs 157 that are configured to operate in concert to receive, retain, and/or seal the recessed housing can 310 (shown in FIGS. 3 and 4) within the plaster frame 150. Further, the plaster frame 150 may include optional hanger bar assemblies 306 that are configured to couple the plaster frame to support structures (e.g., a wall, a piece of wood (joists, rafters, etc.), a metal frame, a concrete pillar) of a mounting structure, such as a ceiling, for mounting the plaster frame and the components supported by the plaster frame, e.g., the junction box 102, recessed housing can 310, etc., in the mounting structure.

In certain example embodiments, in addition to the base wall 502 and the mounting wall 130, the main body 104 of the junction box 102 may include a pair of side walls 128 extending substantially perpendicular to the base wall 502 from opposite lateral edges 173 and 177 (shown in FIGS. 1 and 2) of the base wall 502. Further, the main body 104 may include a top wall 103 and a pair of chamfer walls 110 that are disposed on either end of the top wall 103. In particular, one chamfer wall 110 may be disposed between one end of the top wall 103 and one side wall 128 of the pair of side walls, while the other chamfer wall 110 may be disposed between an opposite end of the top wall 103 and the other side wall 128 of the pair of side walls such that the chamfer walls 110 define an obtuse angle (inner angles 379 shown in FIG. 3) with the top wall 103 and the corresponding side wall 128.

Figure 15:
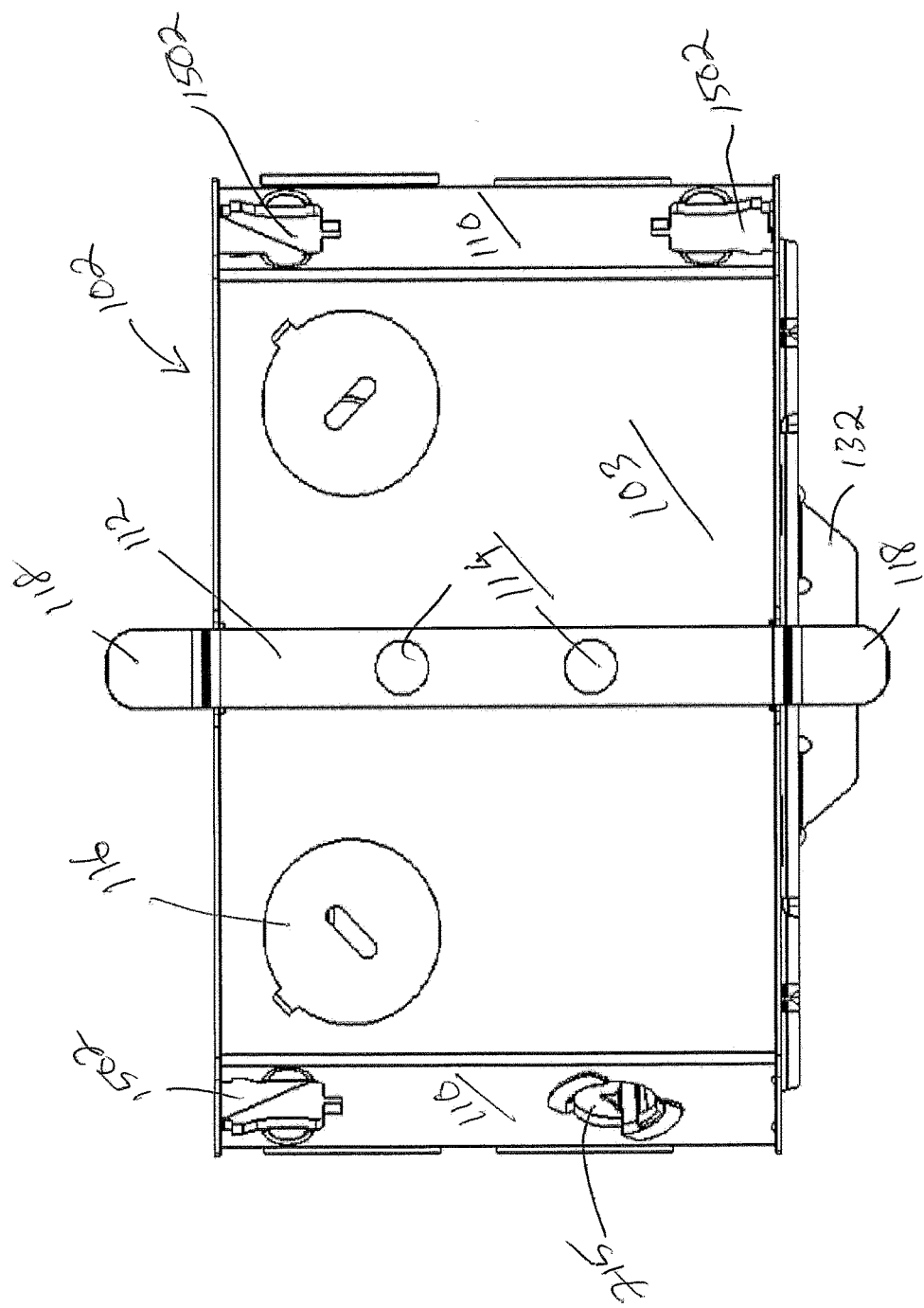
FIG. 15 illustrates a top view of the junction box without the wire traps, in accordance with example embodiments of the present disclosure.

As illustrated in FIG. 15, the chamfer walls 110 may include one or more slots 1502 that are configured to receive and retain wire traps 120. Further, the chamfer walls 110 may also include one or more apertures 715 (shown in FIGS. 7 and 15) that are configured to directly receive wiring conduits 122 without the use of the wire trap 120.

The wire traps 120 may be coupled (e.g., fixedly, slidably, removably) to a slot 1502 in the chamfer walls 110 in any suitable manner. Each wire trap 120 can be used to pass an electrical wiring cable 124 therethrough, where electrical wiring cable 124 can include a single conductor or multiple conductors 126. In particular, each wire trap 120 may include a base 121 and a cap 123 that may be hingedly coupled to the base 121. Typically, the cap 123 of the wire trap 120 may remain in a closed position. However, when an electrical wiring cable is to be inserted into the junction box 102, as shown by wire trap 120a, the cap 123 may be opened to expose an opening in the base 121 through which the electrical wiring cable 124 may be inserted into the junction box 102.

As illustrated in FIGS. 1-5 and 9-13, in one or more example embodiments where the junction box 102 is installed in a shallow plenum space 390, the wire traps 102 in the chamfer walls 110 may be configured to receive horizontally oriented electrical wiring cables 124 from a side of the junction box 102. Alternatively, in other example embodiments where larger plenum space is available, the wire traps 102 in the chamfer walls 110 may be configured to receive vertically oriented electrical wiring cables 1602 (or horizontally oriented electrical wiring cables 124) from above the junction box 102, as illustrated in FIG. 14. In either case, as illustrated in FIGS. 1-5 and 9-14, disposing the wire traps 120 in the chamfer walls 110 allow both the horizontally oriented and vertically oriented electrical wiring cables (124, 1602) to enter the junction box 102 with a slight bend (less than 90 degrees) adjacent to a point of entry of the electrical wiring cables (124, 1602) into the junction box 102 in contrast to conventional junction boxes where the electrical wiring cables have to be substantially bent (e.g., approximately 90 degree) to enter the junction box 102.

In some example embodiments, the chamfer walls 110 may define a substantially 45 degree slope, while, in other example embodiments, the chamfer walls 110 may define a slope having any other acute angle without departing from a broader scope of the present disclosure. In certain example embodiments, the slope of the chamfer walls 110 may be defined such that the cap 123 of the wire trap 120 that is disposed in the chamfer walls 110 does not interfere with a mounting structure, such as the upper ceiling 304, when cap 123 is opened to pass an electrical wiring cable therethrough.

In addition to the slots 1502 and openings 1504 in the chamfer walls 110 of the main body 104, as illustrated in FIGS. 1-3, 5-7, and 9-15, the top wall 103 and the side walls 128 of the main body 104 may include one or more knockouts 116 that can be removed from the main body 104 using appropriate tools or by applying manual pressure to create openings that are configured to receive one or more conductors therethrough.

In certain example embodiments, as illustrated in FIGS. 6-9, the base wall 502, the pair of side walls 128, the top wall 103, and the chamfer walls 110 of the main body 104 may be arranged such that they define a first open side 673 on one side of the main body 102, a second open side 671 on an opposite side of the main body 104, and an inner cavity 802 disposed in between the open sides (671, 673) and the walls (502, 128, 110, and 103) of the main body 103. Even though the present disclosure describes the main body 104 as having multiple walls (502, 128, 130, 110, and 103), one of ordinary skill in the art can understand and appreciate that the multiple walls may be configured and referred to as a single wall that defines the main body 104, the first open side 673, the second open side 671, and the inner cavity 802 without departing from a broader scope of the present disclosure.

In addition to the main body 104, the junction box 102 may also include a first cover plate 108, a second cover plate 106, and a fastening device 112 that is configured to retain the first cover plate 108 and the second cover plate 106 in a closed position. In particular, the first cover plate 108 can have any appropriate shape that allows the first cover plate 108, when engaged with the fastening device 112 and coupled to the base wall 502, to cover the first open side 673 of main body 104 and, in some example embodiments, at least a portion of the bottom of the main body 104 so that little or no gap exists between the first cover plate 108 and the bottom of the main body 104. As illustrated in FIGS. 6-9, the first cover plate 108 may include a side wall 504, a bottom wall 506 that extends substantially perpendicular to the side wall 504 from a longitudinal edge 601 of the side wall 504, and one or more coupling features 508 disposed on an edge of the bottom wall 506 that is distant from the side wall 504. The side wall 504 may be shaped such that it can cover the first open side 673 of the junction box 102 that is left open by the walls (502, 128, 110, and 103) of the main body 104, while the bottom wall 506 may be shaped such that it can cover a notch 651 in the bottom of main body 104 that is defined by an edge 609 of the base wall 502.

As illustrated in FIGS. 6-9, the coupling features 508 can be tabs that have a hooked end. However, one of ordinary skill in the art can understand and appreciate that any other appropriate coupling feature may be used in other example embodiments without departing from a broader scope of the present disclosure. The coupling features 508 of the first cover plate 108 may be used to hingedly and removably couple the first cover plate 108 to the main body 104 by inserting the coupling features 508 of the first cover plate 108 through complementary coupling features 702 (e.g., slots, apertures) in the base wall 502 of the main body 104 that are formed adjacent the edge 609 of the base wall 502. In some example embodiments, the coupling features 508 of the first cover plate 108 may be configured to fit through the complementary coupling features 702 in the base wall 502 of the main body 104 only when the coupling features 508 are inserted into the complementary coupling features 702 at a certain angle. For example, the coupling features 508 of the first cover plate 108 may only fit into the complementary coupling features 702 of the base wall 502 when the side wall 504 of the first cover plate 104 is substantially parallel with the base wall 502 of the main body 104 (such as in an open position shown in FIG. 9). In other example embodiments, the coupling features 508 of the first cover plate 108 may fit through the complementary coupling features 702 in the base wall 502 of the main body 104 when the coupling features 508 are inserted into the complementary coupling features 702 at any appropriate angle without departing from a broader scope of the present disclosure.

Once the first cover plate 108 is hingedly coupled to the main body 104 using the coupling features 508, the first cover plate 108 can be moved or rotated about the base wall 502 from a closed position (shown in FIGS. 1-5, 8, and 14) to an open position 900 (shown in FIG. 9) and vice-versa, while still being coupled to the base wall 502 of the junction box 102. In the closed position, the side wall 504 of first cover plate 108 may cover the first open side 673 of the main body 104, while the bottom wall 506 may cover a notch 651 defined in the base wall 502 of the main body 104. Accordingly, in one or more example embodiments, the bottom wall 506 of the first cover plate 108 may be shaped substantially similar to the shape of the notch 651 defined by the edge 609 of the base wall 502.

Figure 7:
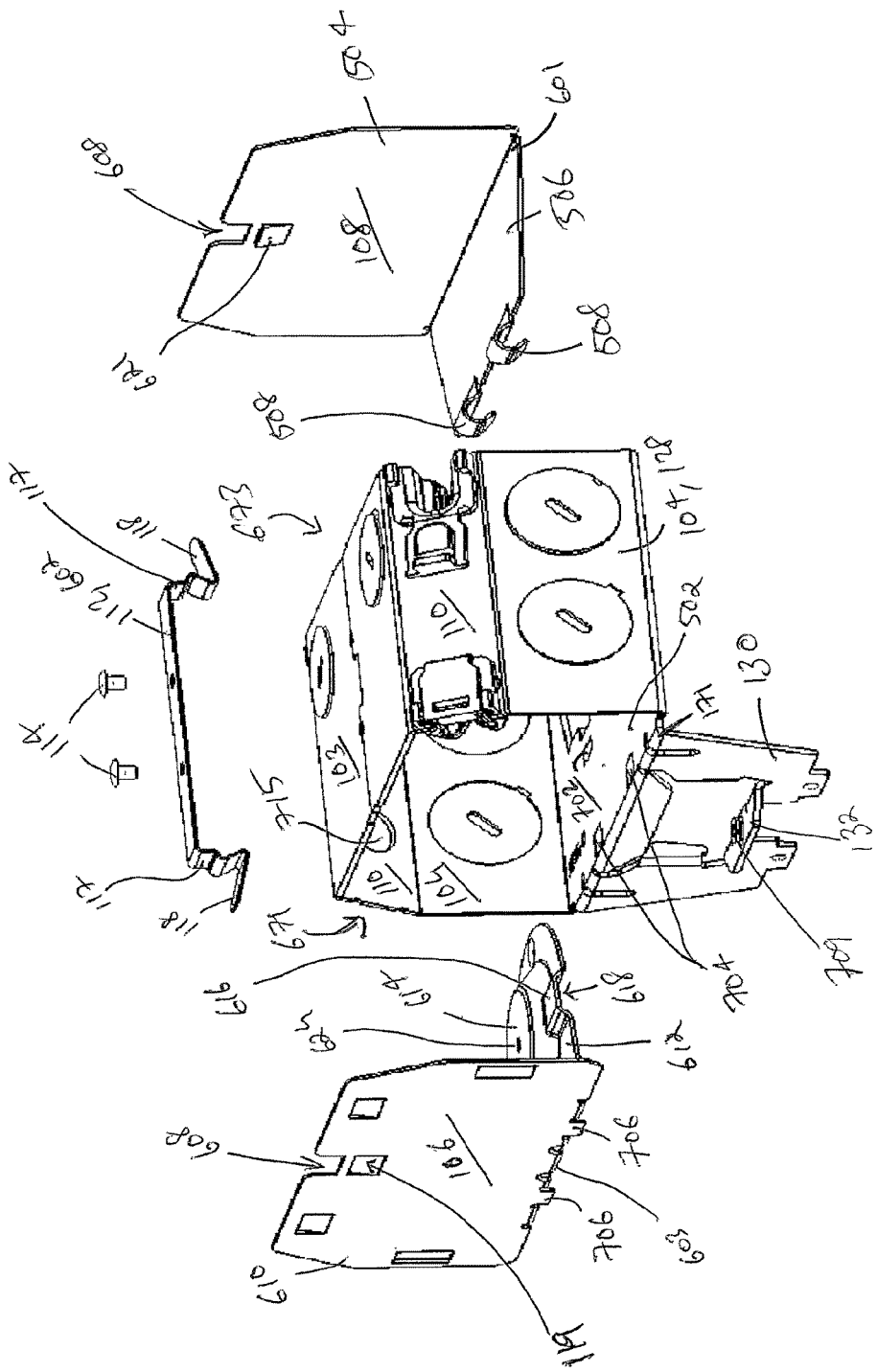
FIG. 7 illustrates another exploded view of the junction box of FIG. 1, in accordance with example embodiments of the present disclosure.

Once the first cover plate 108 is rotated to a closed position, the first cover plate 108 may be retained in the closed position by using the fastening device 112. For example, one of the fastening features 118 of the fastening device 112 may be received in an opening 119 defined in the side wall 504 of the first cover plate 108 to retain the first cover plate 108 in the closed position. The opening 119 may be formed by cutting and bending out a tab 621 from a side wall 504 of the first cover plate 108 as illustrated in FIG. 7. The side wall 504 of the first cover plate 108 may also include a notch 608 that is formed on a top edge of the side wall 504 and above the opening 119 to receive a regressed neck structure 117 of the fastening device 112 that positions the fastening feature 118 at a certain distance below the elongated body 602 of the fastening device 112.

Figure 6:
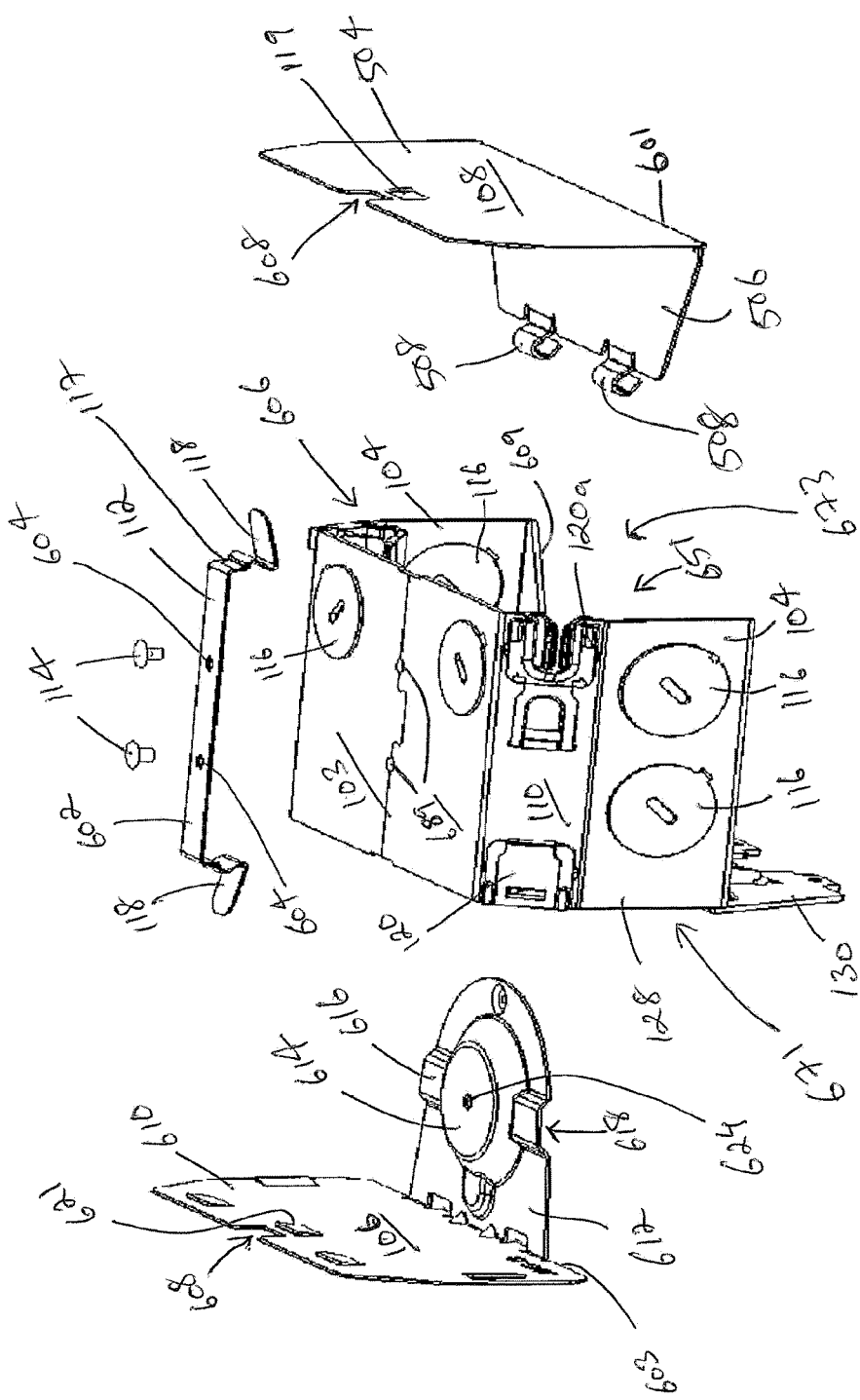
FIG. 6 illustrates an exploded view of the junction box of FIG. 1, in accordance with example embodiments of the present disclosure.

Similar to the first cover plate 108, the second cover plate 106 of the junction box 102 may include a side wall 610 that may be configured and appropriately shaped to cover the second open side 671 of the main body 104 when the second cover plate 106 is engaged with the fastening device 112 and coupled to the base wall 502. Further, the second cover plate 106 may include a component mounting wall 612 that extends substantially perpendicular to the side wall 610 from at least a portion of a longitudinal edge 603 of the side wall 610 as illustrated in FIG. 6. The component mounting wall 612 of the second cover plate 106 may include a mounting pad 614 and a regressed surface 616 (e.g., convex surface) disposed on opposite sides of the mounting pad 614. The regressed surface 616 may be a surface that is raised or elevated above a remainder portion of the component mounting wall 612 such that it defines a cavity 618.

The mounting pad 614 may be configured to mount and securely retain an electrical component 804 (shown in FIGS. 8 and 9-13), such as a transformer, on the second cover plate 106 using a fastener 1402 (shown in FIG. 14), such as a screw, that is passed through a coupling aperture 624 in the mounting pad 614 and the electrical component 804. In other words, the electrical component 804 may be attached to the mounting pad 614 of the second cover plate 106 using a fastener 1402 such that the second cover plate 106 and the electrical component 804 may be accessed and/or moved as a single unit as illustrated in FIGS. 10-13.

In addition to the side wall 610 and the component mounting wall 612, the second cover plate 106 may further include a pair of mounting feet 706 that are configured to removably couple the second cover plate 106 (and/or the electrical component 804 attached thereto) to the base wall 502 of the main body 104. In particular, the second cover plate 106 may be removably coupled to the base wall 502 of the main body 104 by inserting the mounting feet 706 of the second cover plate 106 through corresponding mating slots 704 in the base wall 502 that are formed adjacent to the longitudinal edge 171 of the base wall 502. Once the second cover plate 106 is removably coupled to the main body 104, the second cover plate 106 can be moved or rotated about the base wall 502 from a closed position (shown in FIGS. 1-5, 8, and 14) to a partially open position 1000 (shown in FIG. 10) and vice-versa.

Figure 8:
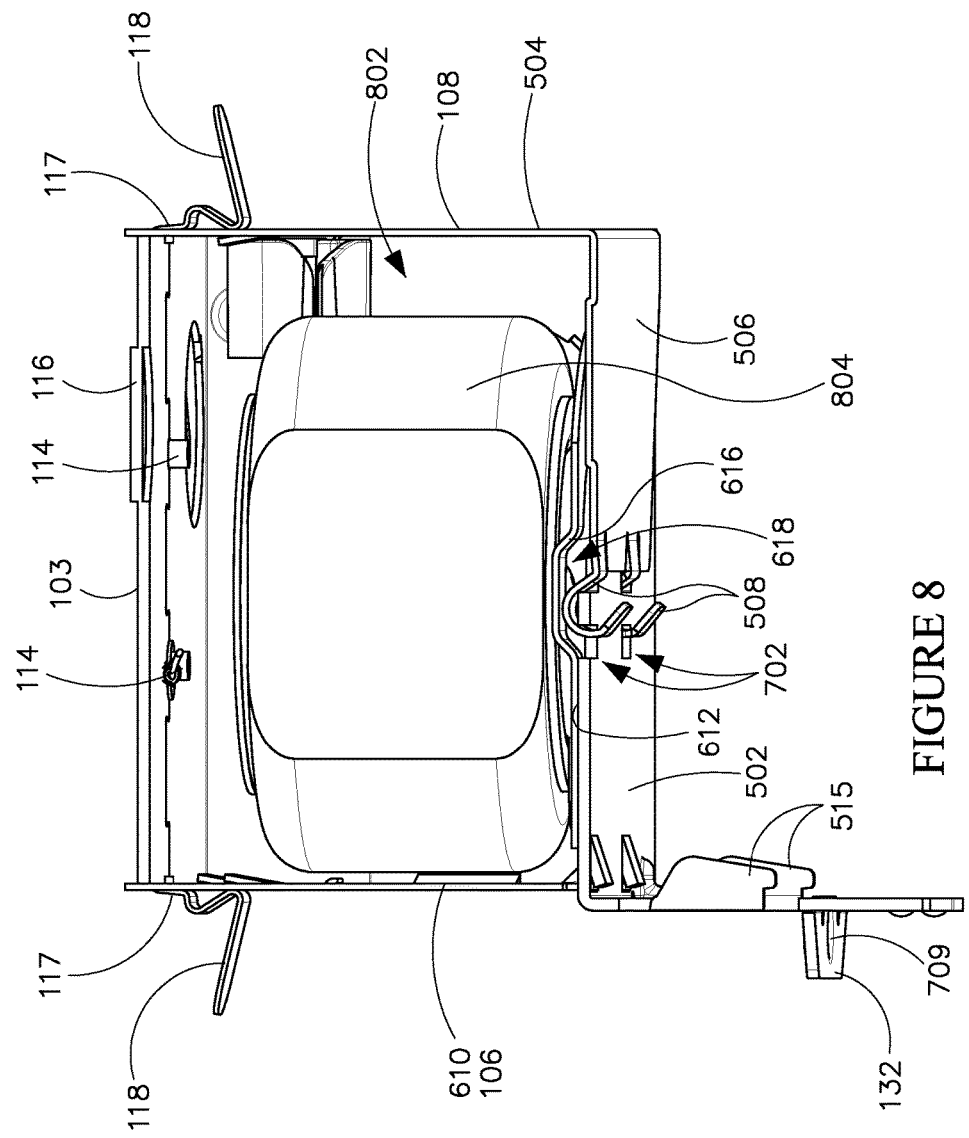
FIG. 8 illustrates a cross-sectional view of the junction box of FIG. 1 with a transformer installed therein, in accordance with example embodiments of the present disclosure.
Figure 9:
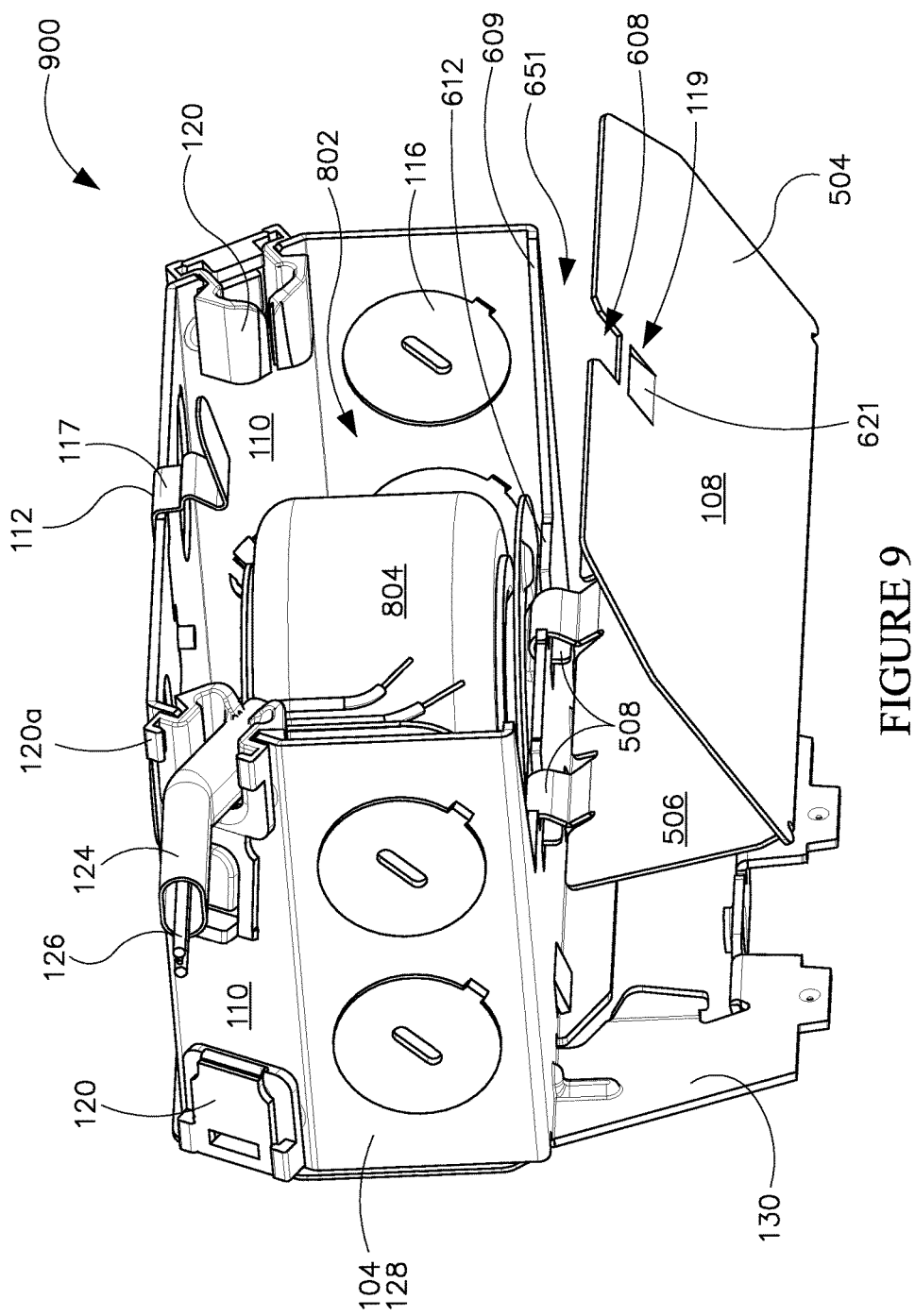
FIG. 9 illustrates the junction box of FIG. 1 with a first cover plate of the junction box in a hinged open position, in accordance with example embodiments of the present disclosure.
Figure 10:
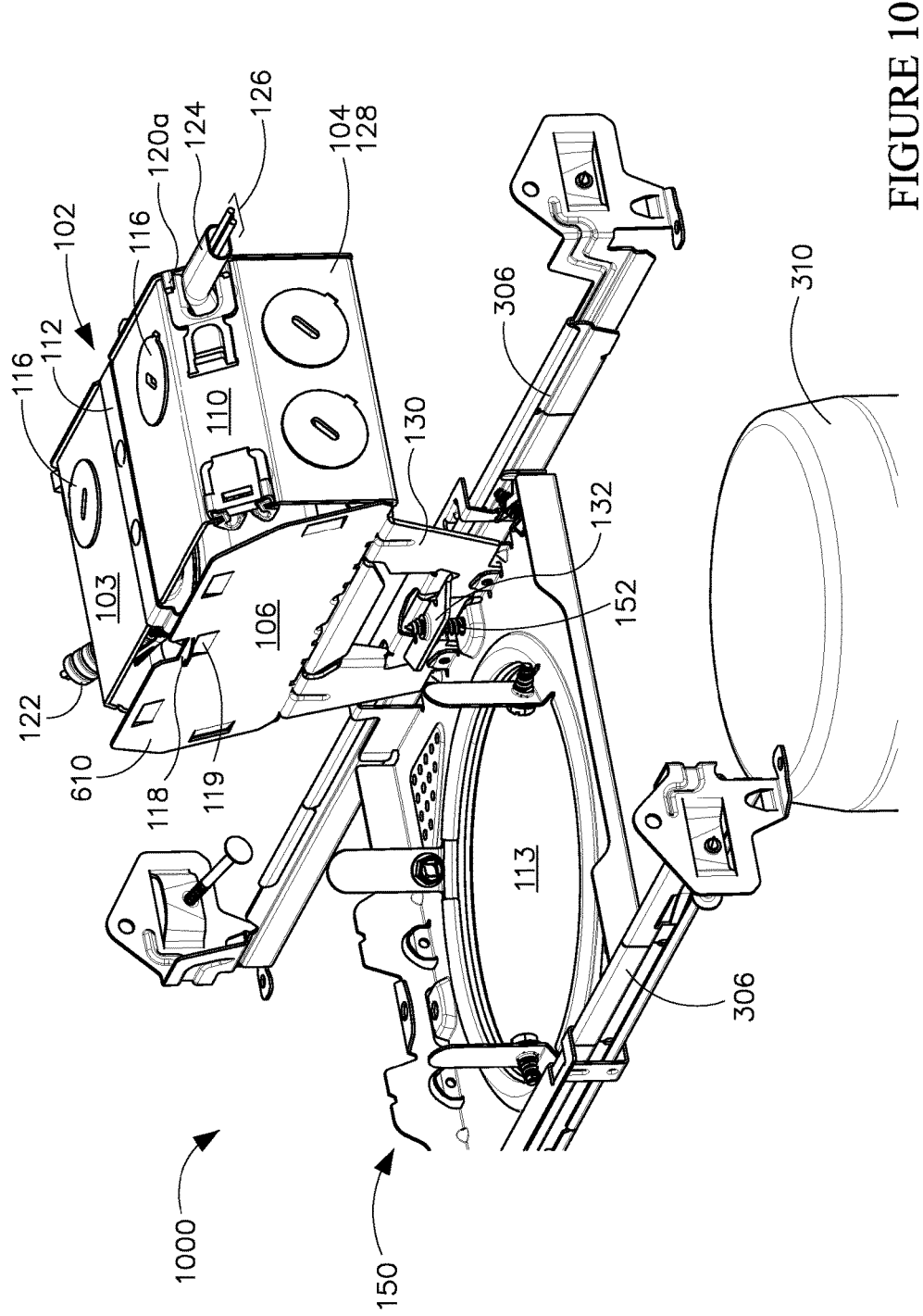
FIGS. 10-13 illustrate how the second cover plate of the junction box of FIG. 1 is opened and the transformer coupled thereto is accessed, in accordance with example embodiments of the present disclosure.

In the closed position, as illustrated in FIGS. 8 and 9, the side wall 610 of the second cover plate 106 may cover the second open side 671 that is defined by the walls (502, 128, 110, and 103) of the main body 104. Further, in the closed position, the component mounting wall 612 of the second cover plate 106 may be disposed on the base wall 502 of the main body 104 such that the component mounting wall 612 and the electrical device 802 attached to the mounting pad 614 of the component mounting wall 612 are disposed in the inner cavity 802 defined by the main body 104.

Furthermore, in the closed position, the regressed surfaces 616 of the component mounting wall 612 may be disposed above the coupling features 702 (e.g., slots, apertures) of base wall 502 such that the cavity 618 defined by the regressed surfaces 616 may accommodate a portion of the coupling features 508 (e.g., hooked ends) of the first cover plate 108 that project into the cavity 802 when the coupling features 508 of the first cover plate 108 are inserted through the coupling features 702 of the base wall 502 to hingedly couple the first cover plate 108 to the base wall 502 of the main body 104. In other words, when the second cover plate 106 is in the closed position and when the coupling features 508 of the first cover plate 108 remain hingedly coupled to the complementary coupling features 702 of the base wall 502, then the second cover plate 106 may trap the coupling feature 508 of the first cover plate 108 between the recessed surfaces 616 of the second cover plate 106 and the base wall 502 to prevent the coupling features 508 of the first cover plate 108 from becoming decoupled from the coupling features 702 of the base wall 502 when the second cover plate 106 is moved from the closed position to the open position 900 (shown in FIG. 9). Such a configuration may be called a hinged and captive configuration. That is, the first cover plate 108 and the second cover plate 106 may be coupled to the base wall 502 of the junction box 102 and arranged with respect to each other in a hinged and captive configuration.

Similar to the first cover plate 108, once the second cover plate 106 is rotated to a closed position, the second cover plate 106 may be retained in the closed position by using the fastening device 112. For example, one of the fastening features 118 of the fastening device 112 may be received in an opening 119 defined in the side wall 610 of the second cover plate 106 to retain the second cover plate 106 in the closed position. The opening 119 may be formed by cutting and bending out a tab 621 from a side wall 610 of the second cover plate 106 as illustrated in FIG. 6. In addition to the opening 119, the side wall 610 of the second cover plate 106 may also include a notch 608 that is formed on a top edge of the side wall 610 and above the opening 119 to receive a regressed neck structure 117 of the fastening device 112 that positions the fastening feature 118 at a certain distance below the elongated body 602 of the fastening device 112.

When the first cover plate 108 and the second cover plate 106 are both retained in a closed position by the fastening device 112, the inner cavity 802 and the electrical component 804 disposed therein may not be accessible to a user. In other words, when the first cover plate 108 and the second cover plate 106 are both in a closed position, the junction box 210 and the inner cavity 802 defined by the main body 802 of the junction box 102 are completely enclosed. When the first cover plate 108 and/or the second cover plate 106 are not in a closed position, i.e., when they are in an open position, the inner cavity 802 and the electrical component 804 disposed therein may be partially or fully accessible. For example, when the respective fastening features 118 of the fastening device 112 that retains the first cover plate 108 and the second cover plate 106 in the closed position are released, the first cover plate 108 and the second cover plate 106 may move from the closed position to an open position 900 (shown in FIG. 9) and partially open position 1000 (shown in FIG. 10), respectively.

For example, as illustrated in FIG. 9, one elongated side, e.g., the first open side 673 of the junction box 102 may be accessed by releasing the fastening feature 118 of the fastening device 112 to allow the first cover plate 108 to rotate away from the base wall 502 and expose the inner cavity 812 of the junction box 102. When the first cover plate 108 rotates to the open position, the bottom wall 612 of the second cover plate 106 maintains the movable coupling between the coupling features 508 of the first cover plate 108 and the coupling features 702 of the base wall 502.

Figure 11:
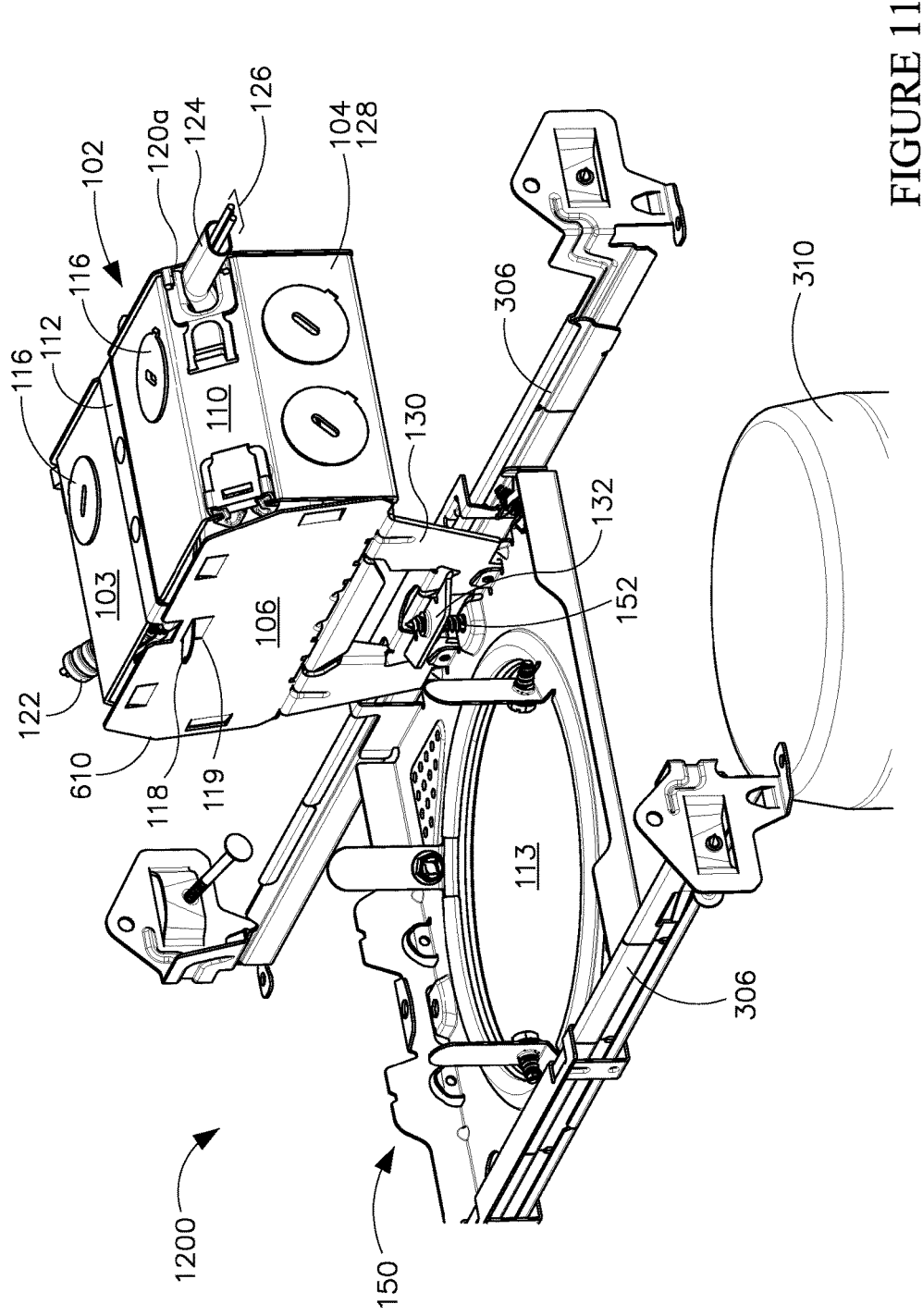
Figure 12:
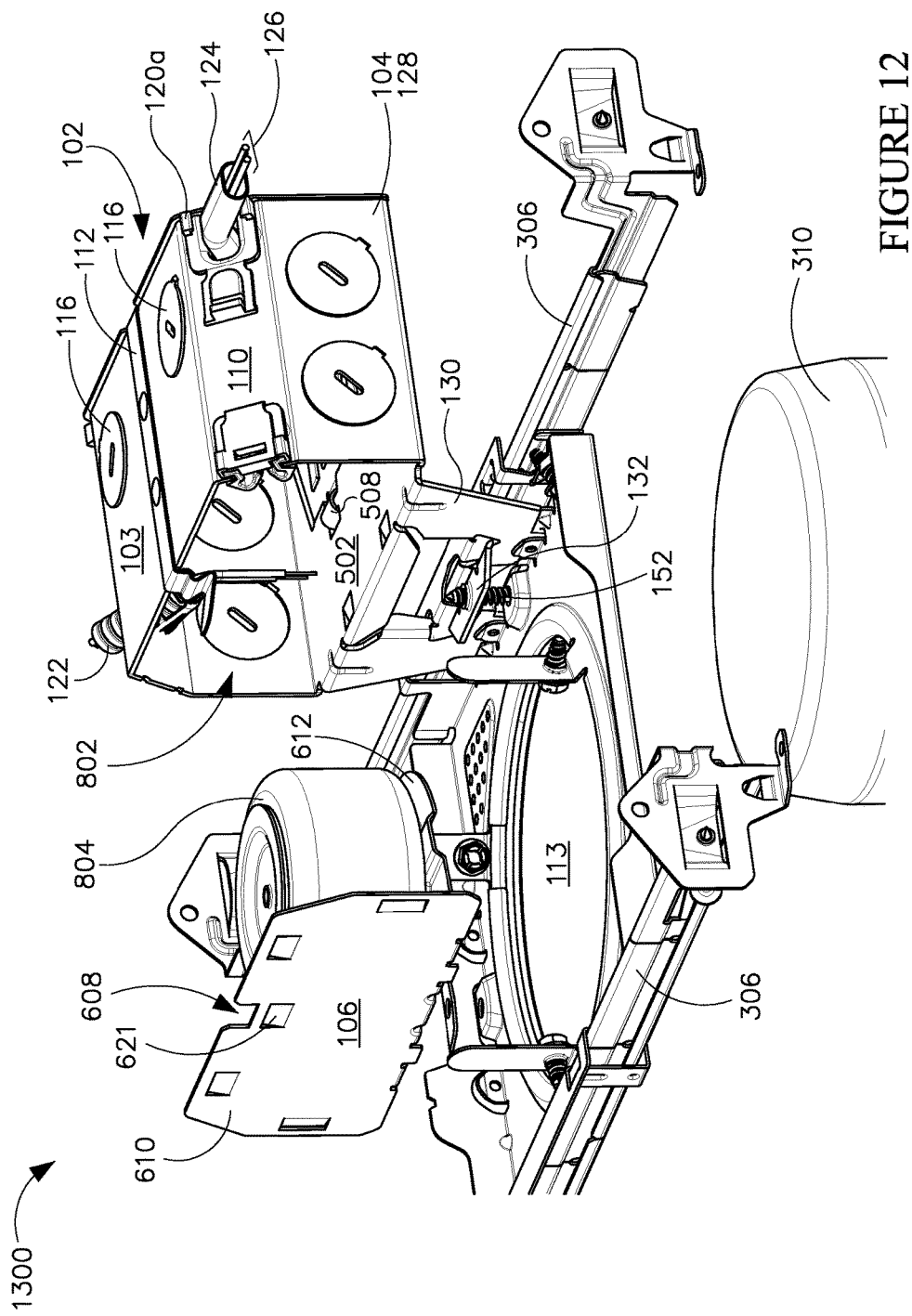
Figure 13:
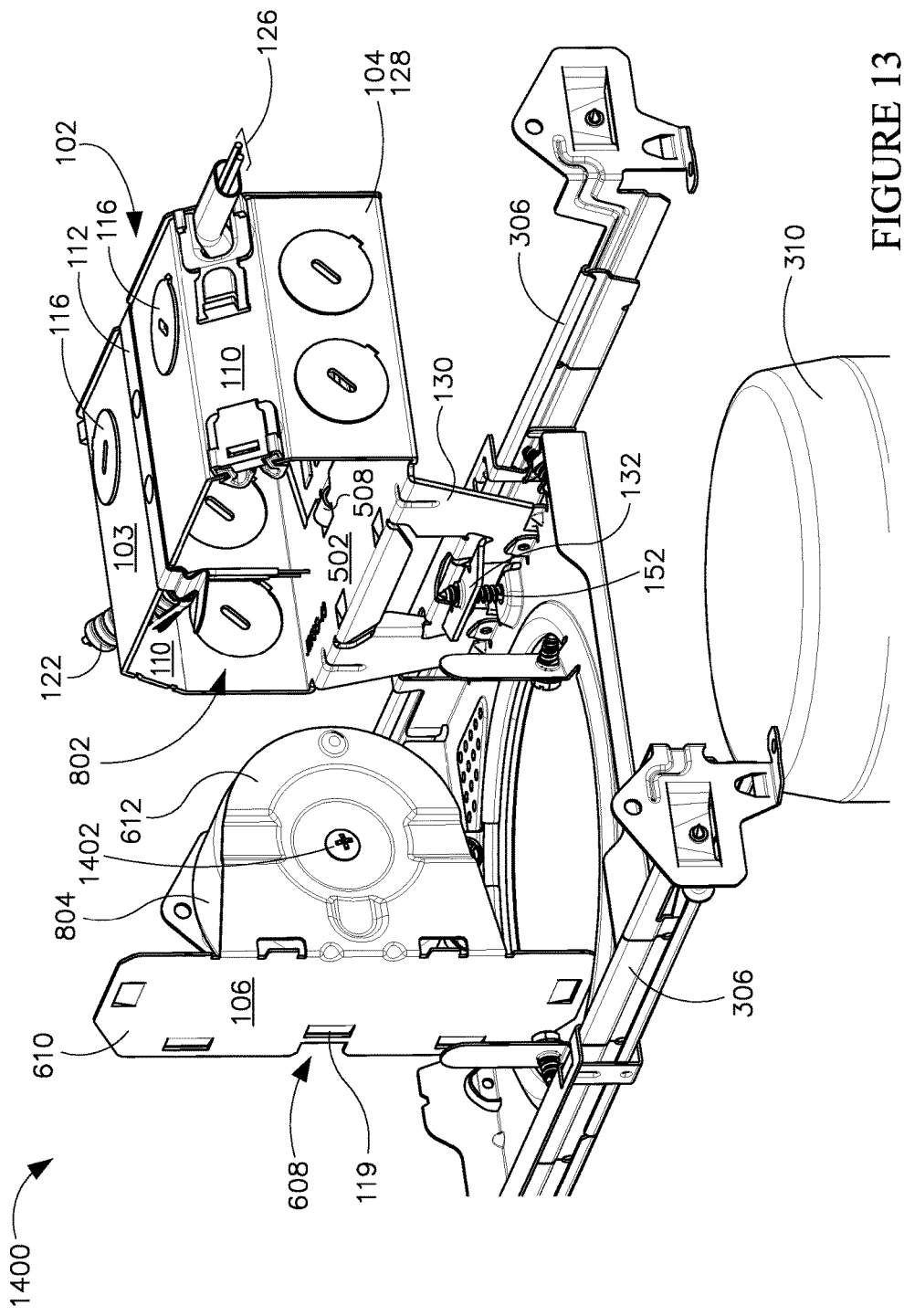
Figure 14:
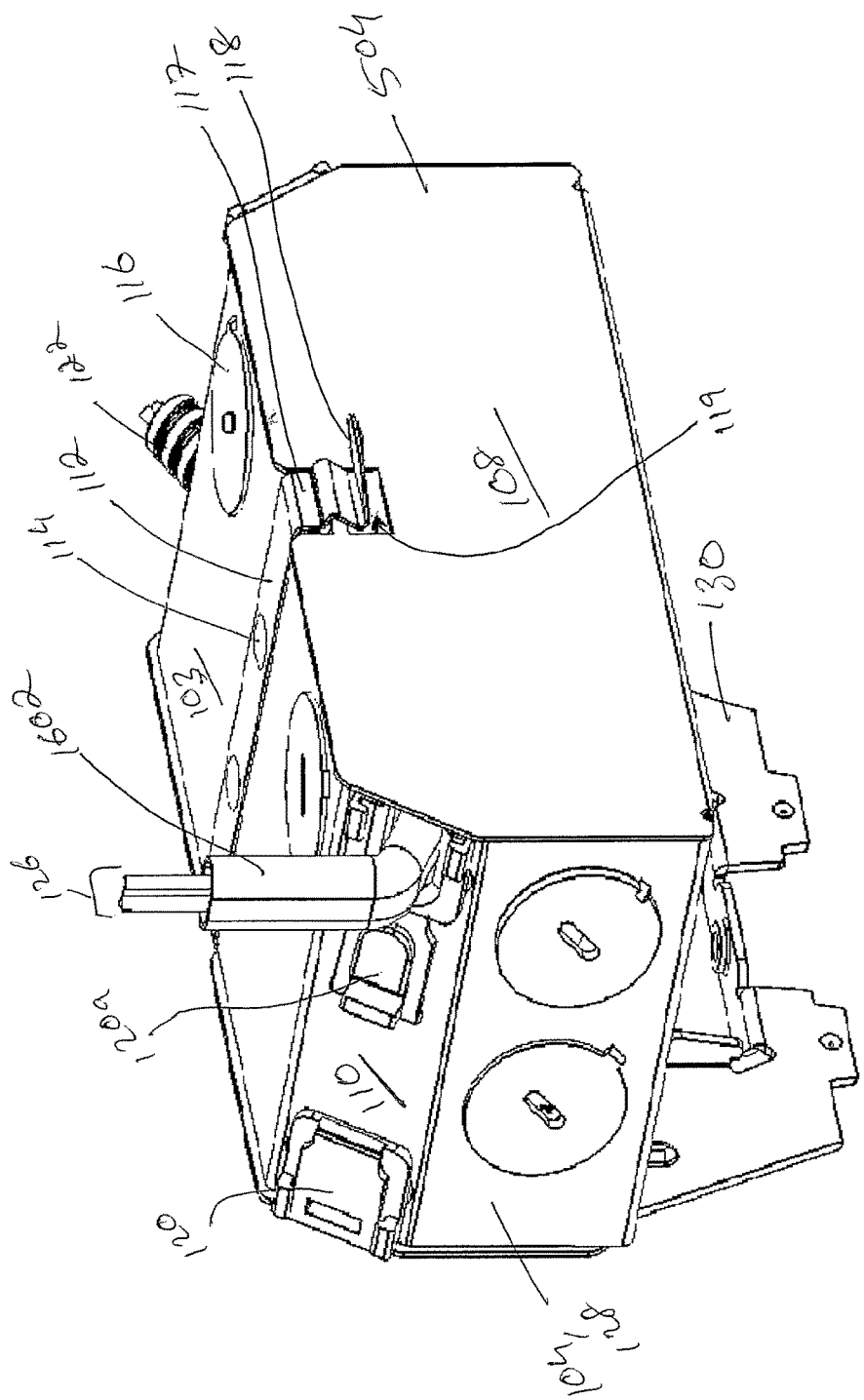
FIG. 14 illustrates a perspective view of the junction box of FIG. 1 with a vertically oriented electrical wiring cable entering the junction box when installed in a mounting structure, such as a ceiling having a larger plenum space, in accordance with example embodiments of the present disclosure.

Further, as illustrated in FIGS. 10-13, another elongated side, e.g., the second open side 671 of the junction box 102 may be accessed by releasing the fastening feature 118 of the fastening device 112 to allow the second cover plate 106 to rotate away from the closed position to a partially open position 1000. Further, as illustrated in FIG. 11, the second cover plate 106 and the electronic component 804 attached thereto may be pushed up as a single unit to release or disengage the mounting feet 706 of the second cover plate 106 from the complementary coupling slots 704 in the base wall 502. Once the mounting feet 706 of the second cover plate 106 are released or disengaged from the complementary coupling slots 704 in the base wall 502, as illustrated in FIG. 12, the second cover plate 106 and the electronic component 804 attached thereto may be released from the junction box 102 as a single unit and moved as a single unit to a position 1200 above the can receiving opening 113 (after removing the recessed can 310) of the plaster frame 150. Then, as illustrated in FIG. 13, the second cover plate 106 with the electronic component 804 attached thereto may be reoriented to a position 1300 by rotating the second cover plate 106 along a horizontal axis that is parallel to the component mounting wall 612 of the second cover plate 106. Responsively, the reoriented second cover plate 106 and the electronic component 804 attached thereto may be removed as a single unit through the can receiving opening 113 in the plaster frame 150. In this manner, the electronic component 804 disposed in the inner cavity 802 of the junction box 102 may be accessed for servicing and/or inspection. Once the servicing and/or inspection of the electronic component 804 is completed, the second cover plate 106 and the electronic component 804 attached thereto may be coupled to or re-installed in the junction box 102 as a single unit by following the steps illustrated in FIGS. 10-13 in reverse order, i.e., starting with FIG. 13 and proceeding to FIG. 10. The second cover plate 106 that is in the partially open position 1000 may be rotated back to the closed position and retained in the closed position using the fastening device 112.

In certain example embodiments, the fastening device 112 may be mechanically coupled (e.g., fixedly, removably) to the main body 104 (e.g., top wall 103) using fasteners 114 (e.g., a rivet, a screw) such that fastening features 118 (e.g., spring clips) disposed on opposite ends of the fastening device 112 may be removably coupled to the first cover plate 108 and the second cover plate 106 to retain the cover plates (106, 108) in the closed position. In particular, as illustrated in FIGS. 6 and 7, the fastening device 112 of the junction box 102 may have an elongated body 602 and a fastening feature 118, such as a spring clip disposed on opposite ends of the elongated body 602. Further, the fastening device 112 may include a regressed neck structure 117 extending substantially perpendicular to the elongated body 602 from either end of the elongated body 602. The fastening features 118 may be coupled to the distal ends of the regressed neck structures 117 that are away from the elongated body 602 such that regressed neck structures 117 are disposed between the elongated body 602 and the fastening features 118. The regressed neck structures 117 are configured to dispose the fastening features 118 at a certain distance below the elongated body 602 such that fastening features 118 do not interfere with mounting structure, such as the upper ceiling 304 when the fastening features 118 are released from the openings 119 in the first and/or second cover plates (106, 108).

The elongated body 602 can have one or more of a number of coupling features 604 (e.g., apertures, tabs) disposed along its length. Such coupling features 604 can be used to mechanically couple the elongated body 602 (and, thereby, the fastening device 112) to the main body 104. For example, the fastening device 112 may be coupled to the main body 104 of the junction box 102 by positioning the elongated body 602 of the fastening device 112 on the top wall 103 of the main body 104 such that the coupling features 604 on the elongated body 602 may axially align with the one or more of a number of complementary coupling features 689 (e.g., apertures, slots) on the top wall 103 of the main body 104, and passing one or more fasteners through the aligned coupling features (604, 689) of the fastening device 112 and the main body 104. Further, the fastening device 112 may be coupled to the main body 104 of the junction box 102 such that the regressed neck structure 117, and the fastening feature 118 of on one end of the fastening device 112 engages the notch 608 and opening 119 defined in the first cover plate 108, and the regressed neck structure 117 and the fastening feature 118 of the opposite end of the fastening device 112 engages the notch 608 and opening 119 defined in the second cover plate 108. Accordingly, the fastening features 118 of the fastening device 112 may be used, at least in part, to mechanically couple the first cover plate 108 and/or the second cover plate 106 to the main body 104 of the junction box 102 and to retain the first cover plate 108 and/or the second cover plate 106 in a closed position.

Certain example embodiments provide a number of benefits. Examples of such benefits include, but are not limited to, simplified installation, simplified inspection, simplified maintenance, installation of a luminaires (including the junction boxes) in relatively small spaces, minimized damage to electrical wiring cables, reduced size or footprint of the luminaire, and reduced cost.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A junction box comprising:
a main body comprising a top wall, a base wall, a pair of junction box side walls and a chamfer wall, the main body defining a first open side and a second open side;
a wire trap disposed on the chamfer wall, the wire trap to receive and pass an electrical wiring cable therethrough; and
a cover plate that comprises:
a cover plate side wall and a component mounting wall that receives an electrical component and that extends inwardly and substantially perpendicular from the cover plate side wall into an inner cavity defined by the main body,
wherein the cover plate is removably coupled to the main body of the junction box and, when the cover plate is in the closed position, the cover plate covers the first open side.

2. The junction box of claim 1:
wherein the electrical component is disposed in the inner cavity when the cover plate is in the closed position.

3. The junction box of claim 2, wherein the electrical component is a transformer.

4. The junction box of claim 1, wherein the junction box further comprises:
a second cover plate that is removably coupled to the main body and covers the second open side; and
an elongated fastening device that comprises:
a first fastening feature that couples to the cover plate, and
a second fastening feature that couples to the second cover plate.

5. The junction box of claim 4:
wherein the elongated fastening device further comprises a first regressed neck structure coupled to the first fastening feature and a second regressed neck structure coupled to the second fastening feature.

6. The junction box of claim 5:
wherein the cover plate comprises a first notch to receive the first regressed neck structure and a first opening formed adjacent to the first notch to receive the first fastening feature, and
wherein the second cover plate comprises a second notch to receive the second regressed neck structure and a second opening formed adjacent to the second notch to receive the second fastening feature.

7. The junction box of claim 1:
wherein the cover plate side wall includes a pair of mounting feet that are configured to engage complementary mating slots in the base wall of the main body to removably couple the cover plate to the main body.

8. The junction box of claim 4:
wherein the second cover plate comprises a second side wall, a second bottom wall that extends substantially perpendicular to the second side wall from a bottom edge of the second side wall, and one or more coupling features that are disposed at a distal end of the second bottom wall that is away from the second side wall, and
wherein the one or more coupling features of the second cover plate are configured to engage complementary coupling features in the base wall of the main body to hingedly and removably couple the second cover plate to the main body.

9. The junction box of claim 8, wherein the one or more coupling features include a tab with a hooked end.

10. The junction box of claim 1:
wherein the component mounting wall of the cover plate includes a regressed surface disposed on opposite sides of a mounting pad, and
wherein each regressed surface defines a cavity that is configured to receive at least a portion of a coupling feature of a second cover plate that is used to hingedly and removably couple the second cover plate to the main body, the second cover plate configured to cover a second open side defined by the main body.

11. The junction box of claim 1:
wherein the cover plate is coupled to the main body such that the component mounting wall of the cover plate is disposed on the base wall of the main body.

12. The junction box of claim 1, wherein the electrical wiring cable is substantially horizontally oriented.

13. The junction box of claim 1, wherein the electrical wiring cable is substantially vertically oriented.

14. A junction box comprising:
a main body comprising a top wall, a base wall, a first side wall connected to a first chamfer wall, and a second side wall connected to the base wall and the top wall, the main body defining a first open side and a second open side;
a first cover plate that is removably coupled to the main body and that covers the first open side defined by the main body when the first cover plate is attached to the main body, the first cover plate comprising a first notch and a first opening;
a second cover plate that is removably coupled to the main body and that covers the second open side defined by the main body when the second cover plate is attached to the main body, the second cover plate comprising a second notch and a second opening; and a fastening device that comprises:
- a first regressed neck received by the first notch and a first fastening feature received by the first opening and configured to retain the first cover plate to the main body, and
- a second regressed neck received by the second notch and a second fastening feature received by the second opening and configured to retain the second cover plate to the main body.

15. The junction box of claim 14:
- wherein the junction box further comprises a wire trap disposed on the chamfer wall, the wire trap configured to receive and pass an electrical wiring cable therethrough, and
- wherein the second cover plate comprises a mounting pad that is configured to attach an electrical component thereto using a fastener such that the second cover plate and the electrical component attached thereto are movable and accessible as a single unit, the electrical component being associated with an operation of a luminaire.

16. The junction box of claim 15, wherein the electrical component is a transformer.

17. The junction box of claim 14, wherein the fastening device further comprises:
- an elongated body that is coupled to the main body of the junction box.

18. The junction box of claim 14, wherein the electrical wiring cable is substantially horizontally oriented.

19. The junction box of claim 14, wherein the electrical wiring cable is substantially vertically oriented.

20. The junction box of claim 14:
- wherein the second cover plate includes a pair of mounting feet that are configured to engage complementary mating slots in the base wall of the main body to hingedly and removably couple the second cover plate to the main body.

* * * * *